(12) United States Patent
Yee et al.

(10) Patent No.: US 7,069,263 B1
(45) Date of Patent: Jun. 27, 2006

(54) AUTOMATIC TREND ANALYSIS DATA CAPTURE

(75) Inventors: David Randall Yee, Burlingame, CA (US); Daryl Geoffrey Porter, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 423 days.

(21) Appl. No.: 10/076,540

(22) Filed: Feb. 19, 2002

(51) Int. Cl.
*G06F 17/30* (2006.01)

(52) U.S. Cl. ............................ 707/3; 707/1; 707/102
(58) Field of Classification Search ............. 707/1–8, 707/10, 100–104.1, 200–203; 382/109; 710/18–20; 345/440, 440.2; 715/769, 765
See application file for complete search history.

(56) References Cited

U.S. PATENT DOCUMENTS

| | | | | |
|---|---|---|---|---|
| 5,355,474 A | * | 10/1994 | Thuraisngham et al. | 707/9 |
| 5,619,688 A | * | 4/1997 | Bosworth et al. | 707/4 |
| 5,666,526 A | * | 9/1997 | Reiter et al. | 707/2 |
| 5,701,461 A | * | 12/1997 | Dalal et al. | 707/4 |
| 5,749,079 A | * | 5/1998 | Yong et al. | 707/100 |
| 5,774,878 A | * | 6/1998 | Marshall | 705/35 |
| 5,930,795 A | * | 7/1999 | Chen et al. | 707/100 |
| 5,960,426 A | * | 9/1999 | Pirahesh et al. | 707/3 |
| 5,974,416 A | * | 10/1999 | Anand et al. | 707/10 |
| 6,023,694 A | * | 2/2000 | Kouchi et al. | 707/2 |
| 6,052,687 A | * | 4/2000 | Miura et al. | 707/100 |
| 6,065,002 A | * | 5/2000 | Knotts et al. | 707/4 |
| 6,112,197 A | * | 8/2000 | Chatterjee et al. | 707/3 |
| 6,201,884 B1 | * | 3/2001 | Van Bemmel et al. | 382/109 |
| 6,289,336 B1 | * | 9/2001 | Melton et al. | 707/3 |
| 6,324,533 B1 | * | 11/2001 | Agrawal et al. | 707/3 |
| 6,356,896 B1 | * | 3/2002 | Cheng et al. | 707/4 |
| 6,363,391 B1 | * | 3/2002 | Rosensteel, Jr. | 707/102 |
| 6,366,917 B1 | * | 4/2002 | St. John Herbert, III | 707/100 |
| 6,411,959 B1 | * | 6/2002 | Kelsey | 707/101 |
| 6,470,210 B1 | * | 10/2002 | Chen et al. | 600/515 |

(Continued)

FOREIGN PATENT DOCUMENTS

EP 0877323 A2 * 3/1998 .................. 17/30

(Continued)

OTHER PUBLICATIONS

Marc A. Minich, Multi tier architectures for database connectivity, Jan. 5, 1998, pp. 1-5, javaexchange.com.*

(Continued)

*Primary Examiner*—Srirama Channavajjala
(74) *Attorney, Agent, or Firm*—Bingham McCutchen LLP (57) ABSTRACT

A method, system, computer program product, and database connectivity layer provides the capability to capture data over time so that trend analysis may be performed that does not require modifications to the data model and the data processing applications. A method of automatically capturing data for trend analysis comprises the steps of: receiving a query for data from a database application, issuing the received query to a database management system, receiving a response to the query from the database management system, the response indicating a result dataset, creating or updating a database table that is suitable for trend analysis, and populating or updating the database table with data from the result dataset.

15 Claims, 7 Drawing Sheets

U.S. PATENT DOCUMENTS

| | | | |
|---|---|---|---|
| 6,523,028 B1 * | 2/2003 | DiDomizio et al. | 707/5 |
| 6,529,217 B1 * | 3/2003 | Maguire, III et al. | 715/769 |
| 6,549,820 B1 * | 4/2003 | Barrett et al. | 700/110 |
| 6,581,052 B1 * | 6/2003 | Slutz | 707/2 |
| 6,581,068 B1 * | 6/2003 | Bensoussan et al. | 707/104.1 |
| 6,604,102 B1 * | 8/2003 | Klein et al. | 707/4 |
| 6,668,253 B1 * | 12/2003 | Thompson et al. | 707/10 |
| 6,694,305 B1 * | 2/2004 | Bernal et al. | 707/2 |
| 6,694,306 B1 * | 2/2004 | Nishizawa et al. | 707/3 |
| 6,704,744 B1 * | 3/2004 | Williamson et al. | 707/101 |
| 6,721,725 B1 * | 4/2004 | Levy et al. | 707/2 |
| 6,763,352 B1 * | 7/2004 | Cochrane et al. | 707/4 |
| 6,801,921 B1 * | 10/2004 | Tsuchida et al. | 707/204 |
| 6,813,581 B1 * | 11/2004 | Snyder | 702/130 |
| 2001/0051939 A1 * | 12/2001 | Yoshimura et al. | 707/3 |
| 2002/0070953 A1 * | 6/2002 | Barg et al. | 345/700 |
| 2002/0087389 A1 * | 7/2002 | Sklarz | 705/10 |
| 2002/0128884 A1 * | 9/2002 | Heching et al. | 705/7 |
| 2002/0143749 A1 * | 10/2002 | Hartel et al. | 707/3 |
| 2003/0041052 A1 * | 2/2003 | Gajda et al. | 707/3 |
| 2003/0088546 A1 * | 5/2003 | Brown et al. | 707/3 |
| 2004/0088717 A1 * | 5/2004 | Chen et al. | 719/321 |
| 2004/0267690 A1 * | 12/2004 | Bhogal et al. | 707/1 |

FOREIGN PATENT DOCUMENTS

| | | | | |
|---|---|---|---|---|
| EP | 0971321 A2 * | 1/2000 | | |
| WO | WO 98/44438 | * | 10/1998 | 17/30 |
| WO | WO 00/23917 | * | 4/2000 | 17/30 |
| WO | WO 00/48101 | * | 8/2000 | 17/60 |
| WO | WO 01/37135 A2 * | 5/2001 | | 17/30 |
| WO | WO 03/023656 A1 * | 3/2003 | | 17/30 |

OTHER PUBLICATIONS

Robin Schumascher, "Why you need capacity planning", Database trends and applications, vol. 18, No. 7, Jul. 2004, 1-2 pages.*

Hilary K Browne et al. "A trend analysis of exploitations", CS-TR-4200, UMIACS-TR-2000-76, Nov. 9, 2000, pp. 1-22.*

Craig S Mullins, "Managing database change", database trends, Oct. 2000, 6 pages.*

Internet security systems, Inc "trend analysis", server: SYB11, Sybase adaptive server, printed May 17, 2000, pp. 1-5.*

Jiawei Han et al. "DBMiner: A system for data mining in relational databases and data warehouses", IBM centre for advanced studies conference, procedings of the 1997 conference of the centre for advanced studies on collaborative research, 1997, p. 1-12.*

SQL Database Connectivity for Application and Interface Development: MAXDB, Mar. 2004, pp. 1-5.*

Microsoft solution for Windows-based hosting version 3.5, "monitoring and reporting overview", white paper published May 2005, 12 pages.*

Kristian Torp et al. "Effective timestamping in database", The VLDB Journal vol. 8, No. 3-4, Feb. 2000, pp. 267-288.*

Franklin J Garner, III et al. "PDF Forms and database connectivity solutions", Sep. 26, 2005 10 pages.*

* cited by examiner

AUTOMATIC TREND ANALYSIS DATA CAPTURE

FIELD OF THE INVENTION

The present invention relates to automatic capture of data from a database query and the addition of information to allow trend analysis.

BACKGROUND OF THE INVENTION

A common task in many organizations is the creation and preparation of reports based on data generated using metrics or standards of measurement. Such a report, which provides a snapshot of the data in time, is often just a first step. It is often desirable to capture the same data over time, in order to prepare reports that analyze trends in the data or the underlying entities or conditions. Conventionally, in order to prepare trend reports, the data model used must be extended, the data processing applications must be modified in order to capture data over time, and then trend analysis tools must be used to observe trends in the data. This process requires labor-intensive modifications to the data model and the data processing applications, which is time-consuming and expensive. A need arises for a technique by which data can be captured over time so that trend analysis may be performed that does not require modifications to the data model and the data processing applications.

SUMMARY OF THE INVENTION

The present invention is a method, system, computer program product, and database connectivity layer that provides the capability to capture data over time so that trend analysis may be performed that does not require modifications to the data model and the data processing applications.

In one embodiment of the present invention, a method of automatically capturing data for trend analysis comprises the steps of: receiving a query for data from a database application, issuing the received query to a database management system, receiving a response to the query from the database management system, the response indicating a result dataset, creating or updating a database table that is suitable for trend analysis, and populating or updating the database table with data from the result dataset.

In one aspect of the present invention, the creating step comprises the steps of analyzing a format of the result dataset and creating the database table based on the format of the result dataset or updating an existing database table based on the format of the result dataset.

In one aspect of the present invention, the populating or updating step comprises the step of populating or updating the database table with data from the result dataset and with timestamp information.

In one aspect of the present invention, the response indicating the result dataset indicates a result data table and the populating or updating step further comprises the step of, for each row of data in the result data table, populating or updating a row in the database table with the row of data and with timestamp information.

In one aspect of the present invention, the response indicating the result dataset indicates a result data table and the populating or updating step comprises the steps of determining whether the result data table includes all rows of data in the result dataset, retrieving all rows in the result dataset, if the result data table does not include all rows in the result dataset, and, for each row of data in the result data set, populating or updating a row in the database table with the row of data and with timestamp information.

In one aspect of the present invention, the method further comprises the step of determining whether the result dataset is to be captured for trend analysis; and wherein the creating or updating step comprises the step of creating or updating a database table that is suitable for trend analysis, if the result dataset is to be captured for trend analysis. The creating or updating step may comprise the steps of analyzing a format of the result dataset and creating the database table based on the format of the result dataset or updating an existing database table based on the format of the result dataset. The populating or updating step may comprise the step of populating or updating the database table with data from the result dataset and with timestamp information. The response indicating the result dataset indicates a result data table and the populating or updating step may comprise the step of for each row of data in the result data table, populating or updating a row in the database table with the row of data and with timestamp information. The response indicating the result dataset indicates a result data table and the populating or updating step may comprise the steps of determining whether the result data table includes all rows of data in the result dataset, retrieving all rows in the result dataset, if the result data table does not include all rows in the result dataset, and for each row of data in the result data set, populating or updating a row in the database table with the row of data and with timestamp information.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
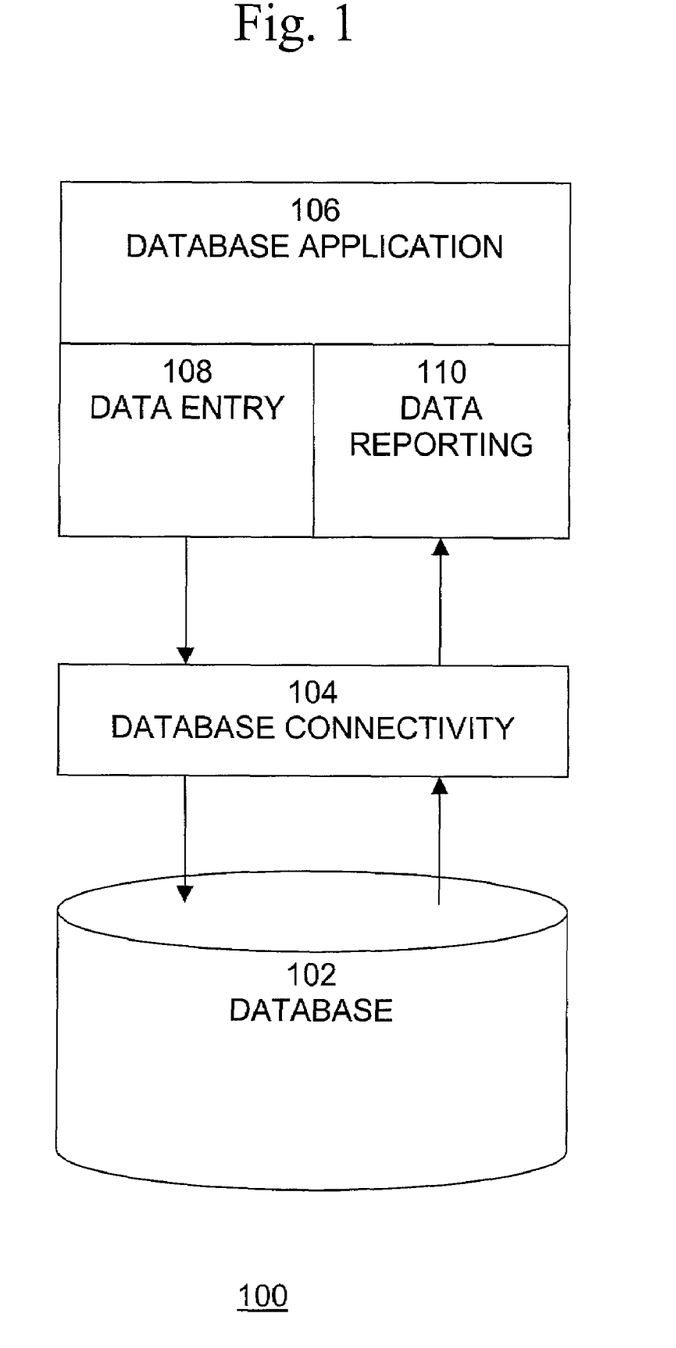
FIG. 1 is a block diagram of an exemplary database management system in which the present invention may be implemented.

An exemplary database management system 100, in which the present invention may be implemented, is shown in FIG. 1. System 100 includes database 102, database connectivity layer 104, and database application 106. Database management system (DBMS) 100 provides the capability to store, organize, modify, and extract information from database 102. From a technical standpoint, DBMSs can differ widely. The terms relational, network, flat, and hierarchical all refer to the way a DBMS organizes information internally. The internal organization can affect how quickly and flexibly you can extract information.

Database 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database, such as database 102, includes not only data, but also low-level database management functions, which perform accesses to the database and store or retrieve data from the database. Such functions are often termed queries and are performed by using a database query language, such as structured query language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Database application 106 is software that implements a particular set of functions that utilize database 102. Examples of database applications include:

computerized library systems
automated teller machines
flight reservation systems
computerized parts inventory systems Typically, a database application, such as database application 106 includes data entry functions 108 and data reporting functions 110. Data entry functions provide the capability to enter data into database 102. Data entry may be performed manually, by data entry personnel, automatically, by data entry processing software that receives data from connected sources of data, or by a combination of manual and automated data entry techniques. Data reporting functions 110 provide the capability to select and retrieve data from database 102 and to process and format that data for other uses. Typically, retrieved data is used to display information to a user, but retrieved data may also be used for other functions, such as account settlement, automated ordering, numerical machine control, etc.

Typically, database applications are written using standard programming languages, such as C, C++, JAVA, etc. Database connectivity layer 104 provides an interface between the database application 106, and the low-level database functionality performed by the database 102. Typically, database connectivity layer 104 is implemented as an application program interface (API), which is a set of routines, protocols, and tools for building software applications. For example, for a database application 106 written using the JAVA programming language, database connectivity layer may include the Java Database Connectivity, which is a Java API that enables Java programs to execute SQL statements. This allows Java programs to interact with any SQL-compliant database. Since nearly all relational database management systems (DBMSs) support SQL, and because Java itself runs on most platforms, JDBC makes it possible to write a single database application that can run on different platforms and interact with different DBMSs.

As another example, database connectivity layer 104 may include Open DataBase Connectivity (ODBC), which is another standard database access method. The goal of ODBC is to make it possible to access any data from any application, regardless of which database management system (DBMS) is handling the data. JDBC and ODBC are similar in function and purpose, but JDBC is designed specifically for Java programs, whereas ODBC is not.

Figure 2:
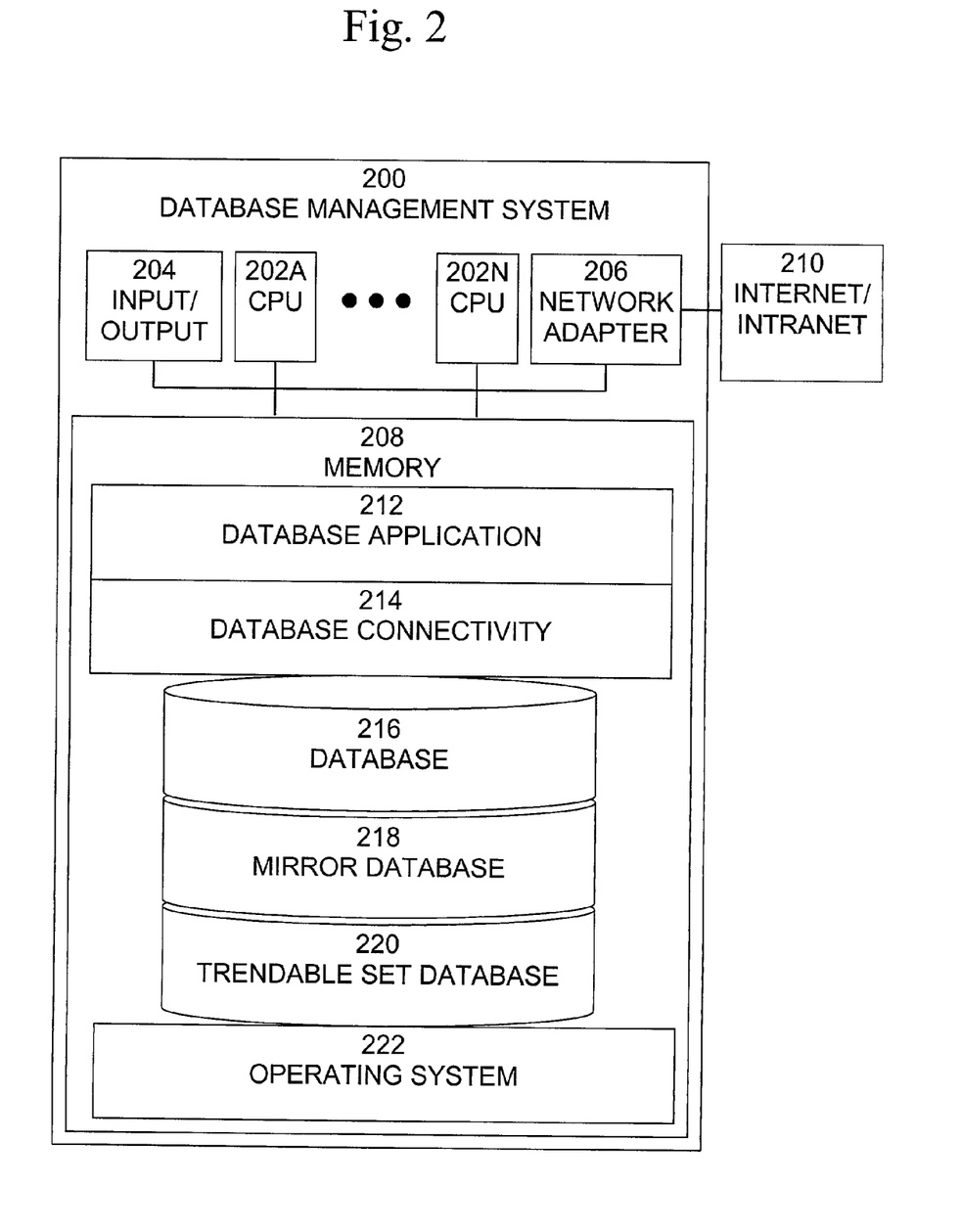
FIG. 2 is a block diagram of an exemplary implementation of a database management system in which the present invention may be implemented.

A block diagram of an exemplary implementation of a database management system 200, in which the present invention may be implemented, is shown in FIG. 2. System 200 is typically a programmed general-purpose computer system, such as a personal computer, workstation, server system, and minicomputer or mainframe computer. System 200 includes one or more processors (CPUs) 202A–202N, input/output circuitry 204, network adapter 206, and memory 208. CPUs 202A–202N execute program instructions in order to carry out the functions of the present invention. Typically, CPUs 202A–202N are one or more microprocessors, such as an INTEL PENTIUM® processor. FIG. 2 illustrates an embodiment in which System 200 is implemented as a single multi-processor computer system, in which multiple processors 202A–202N share system resources, such as memory 208, input/output circuitry 204, and network adapter 206. However, the present invention also contemplates embodiments in which System 200 is implemented as a plurality of networked computer systems, which may be single-processor computer systems, multi-processor computer systems, or a mix thereof.

Input/output circuitry 204 provides the capability to input data to, or output data from, database/System 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces database/System 200 with Internet/intranet 210. Internet/intranet 210 may include one or more standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of system 200. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 2, memory 208 includes database application 212, database connectivity layer 214, database 216, mirror database 218, trendable set database 220 and operating system 222. Database application 212 is software that implements a particular set of functions that utilize database 216. Typically, a database application, such as database application 212 includes data entry functions and data reporting functions. Database connectivity layer 214 provides an interface between the database application 212, and the low-level database functionality performed by the database 216. Database 216 includes a collection of information organized in such a way that computer software can select and retrieve desired pieces of data. In particular, database 216 includes information upon which trend analysis is to be performed by the present invention. Database 216 may also include low-level database management functions, which perform accesses to the database and store or retrieve data from the database. Mirror database 218 includes a copy of information that was retrieved from database 216 upon which trend analysis is to be performed, along with additional information that is generated in order to facilitate the trend analysis, such as timestamp information. Trendable set database 220 includes information identifying those datasets upon which trend analysis is to be performed. Operating system 222 provides overall system functionality.

In the example shown in FIG. 2, database application 212, database connectivity layer 214, database 216, mirror database 218, and trendable set database 220 are all shown included in database management system 200. However, one of skill in the art would recognize that this is merely one possible implementation. In other implementations, database application 212, database connectivity layer 214, database 216, mirror database 218, and trendable set database 220 may each be implemented in one or more separate, networked computer systems, they may be grouped in various configurations, or they may be even further distributed. This grouping and distribution of functional components is an implementation detail and the present invention contemplates any and all such possible implementations.

In addition, as shown in FIG. 2, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 3:
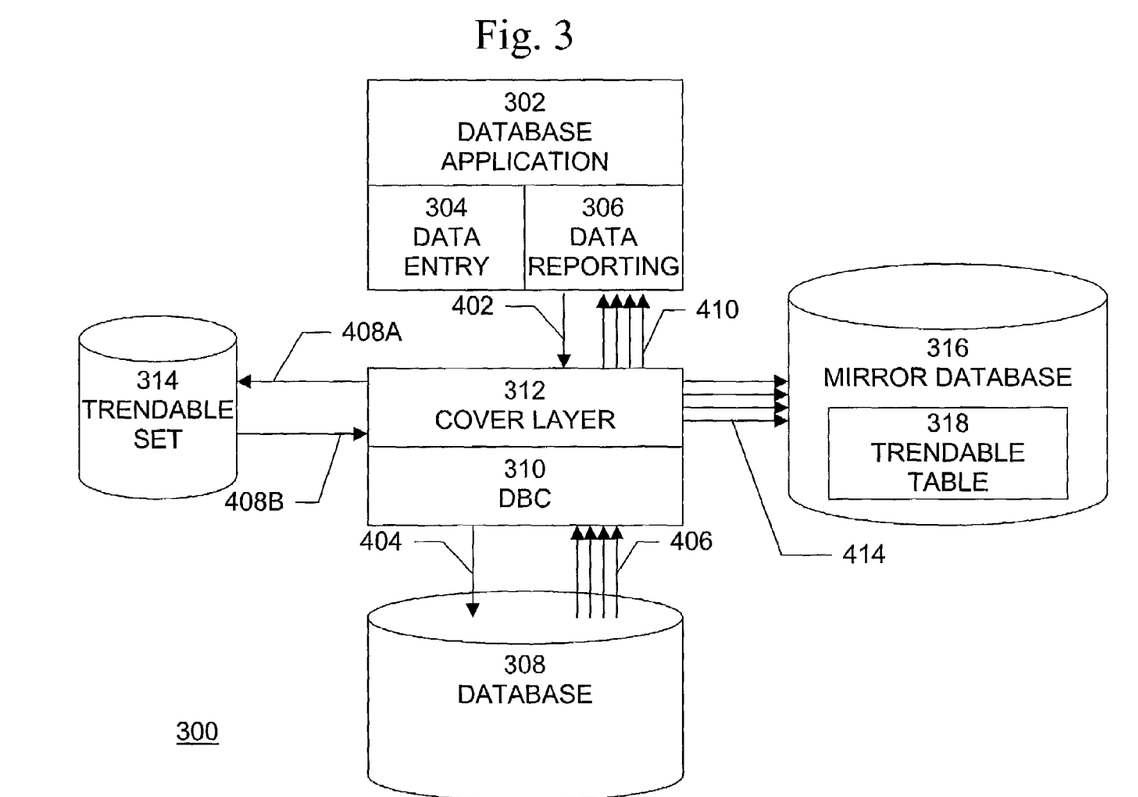
FIG. 3 is an exemplary block diagram and data flow diagram of one embodiment of a database management system that includes trend analysis.

An exemplary block diagram and data flow diagram of one embodiment of a database management system 300 that includes trend analysis is shown in FIG. 3. In this embodiment, database application 302, including data entry functions 304 and data reporting functions 306, and database 308 require no modification in order to implement the trend analysis functions provided by the present invention. In addition, database connectivity layer 310 need not be directly modified, but rather is enhanced by a cover layer 312, which becomes the direct interface with database application 302. Cover layer 312 captures and implements invocations by database application 302 of functions included in database connectivity layer 310 that may involve trend analysis, but passes through to database connectivity layer 310 invocations by database application 302 of functions that do not involve trend analysis. Generally, this approach is advantageous in an object-oriented software environment, in which polymorphism and abstraction allow the programming code that invokes a function to be independent of the underlying implementation of the function. This allows the programming code of database application 302 to be used without modification, even though some function invocations may perform trend analysis and some do not.

System 300 includes trendable set database 314, which provides registration of those queries for which trend analysis is to be performed. Cover layer 312, upon capturing a function invocation from database application 302 for which trend analysis may be performed, will access trendable set database 314 to determine if the particular database query involved has been registered as one for which trend analysis is to be performed. System 300 also includes mirror database 316, which includes trendable table 318, which is a copy of information that was retrieved from database 308 upon which trend analysis is to be performed, along with additional information that is generated in order to facilitate the trend analysis, such as timestamp information.

Figure 4:
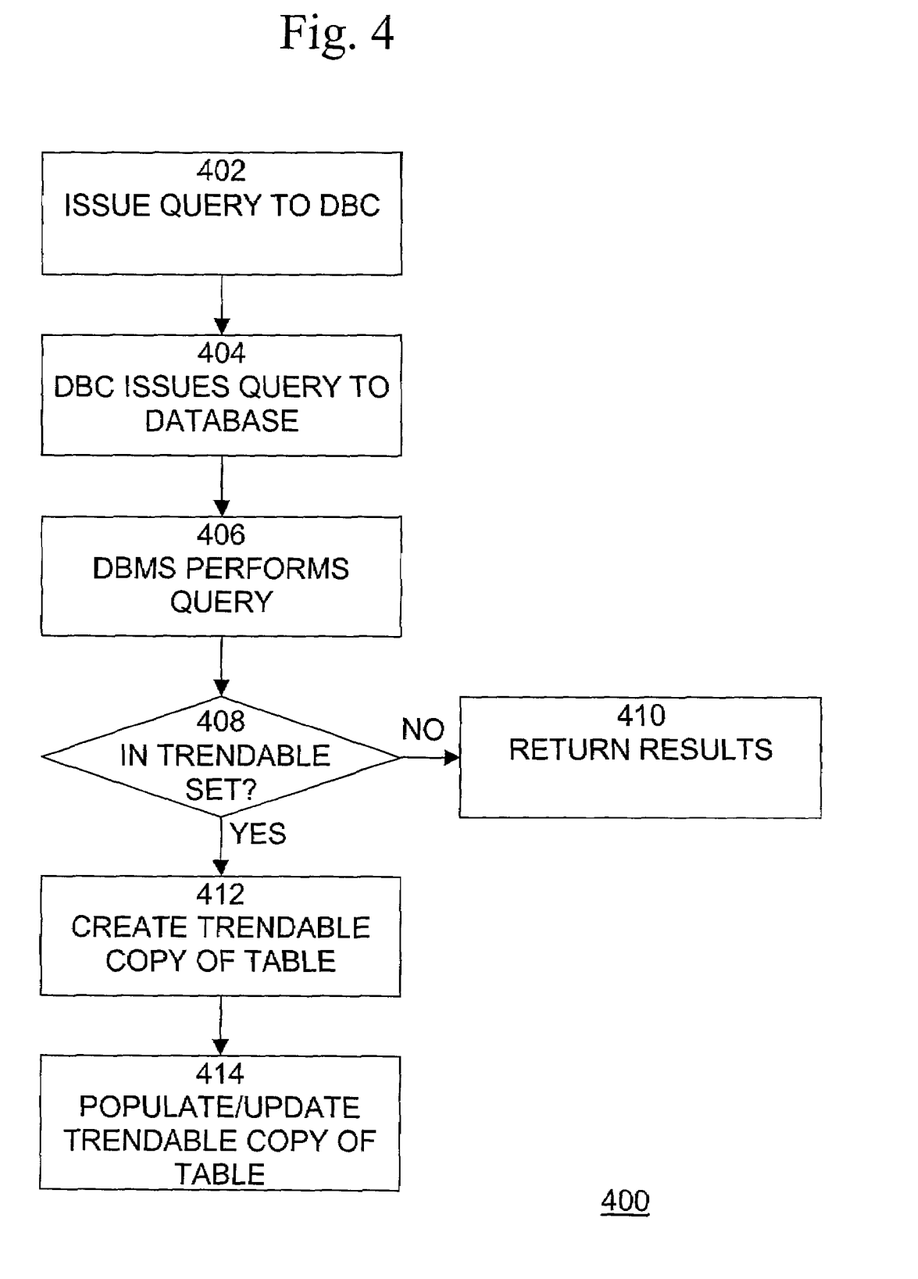
FIG. 4 is a flow diagram of a process of operation of the database management system shown in FIG. 3.

A flow diagram of a process of operation 400 of database management system 300 is shown in FIG. 4. It is best understood with reference to FIG. 3. Process 400 begins with step 402, in which a query is issued by database application 302. As trend analysis is a data reporting function, rather than a data entry function, the query is issued from among the data reporting functions 306 included in database application 302. The query is issued to cover layer 312, which passes the query to database connectivity layer 310. In step 404, database connectivity layer 310 issues the query to database 308. In step 406, database 308 performs the query by accessing and retrieving the stored information specified by the query and returning the retrieved result set, or a pointer or reference to the retrieved result set, to database connectivity layer 310 and cover layer 312.

In step 408, cover layer 312 determines if the particular database query involved has been registered as one for which trend analysis is to be performed. In particular, cover layer 312 performs an access 408A of trendable set 314 and receives an indication 408B of whether the particular database query for which the retrieved result set was generated is registered as trendable, that is a query for which trend analysis should be performed. If cover layer 312 determines that the database query involved has not been registered as one for which trend analysis is to be performed, then in step 410, the retrieved result set, or a pointer or reference to the retrieved result set, is returned to database application 302.

However, if, in step 408, cover layer 312 determines that the database query involved has been registered as one for which trend analysis is to be performed, then in step 412, a trendable copy of a database table, trendable table 318, that is suitable to store the data included in the retrieved result set is created or updated in mirror database 316. Trendable table 318 is only created if it is not already in existence. For example, the first time a particular database query for which trend analysis is to be performed is executed, trendable table 318 is created. Subsequent executions of that same query will not cause trendable table 318 to be created. In step 414, the retrieved result set is transmitted to mirror database 316 and the trendable table 318 is populated or updated with the retrieved result set and other data needed to perform trend analysis, such as a time stamp on each row of data entered into the trendable table 318. In addition, the retrieved result set is returned to database application 302 The first time a particular database query for which trend analysis is to be performed is executed, the newly created trendable table 318 is populated with the retrieved result set and other data. Subsequent executions of that same query will cause trendable table 318 to be updated with the addition of the current retrieved result set and other data. Thus, multiple executions of a particular database query build up trendable table 318 to contain multiple retrieved result sets, along with the other data, such as timestamp information, that allow trend analysis to be performed. The resulting trendable table 318, or more commonly a pointer or reference to trendable table 318, is returned to data base application 302 via cover layer 312. Trend analysis may then be performed upon the trendable table 318, as desired.

Figure 5:
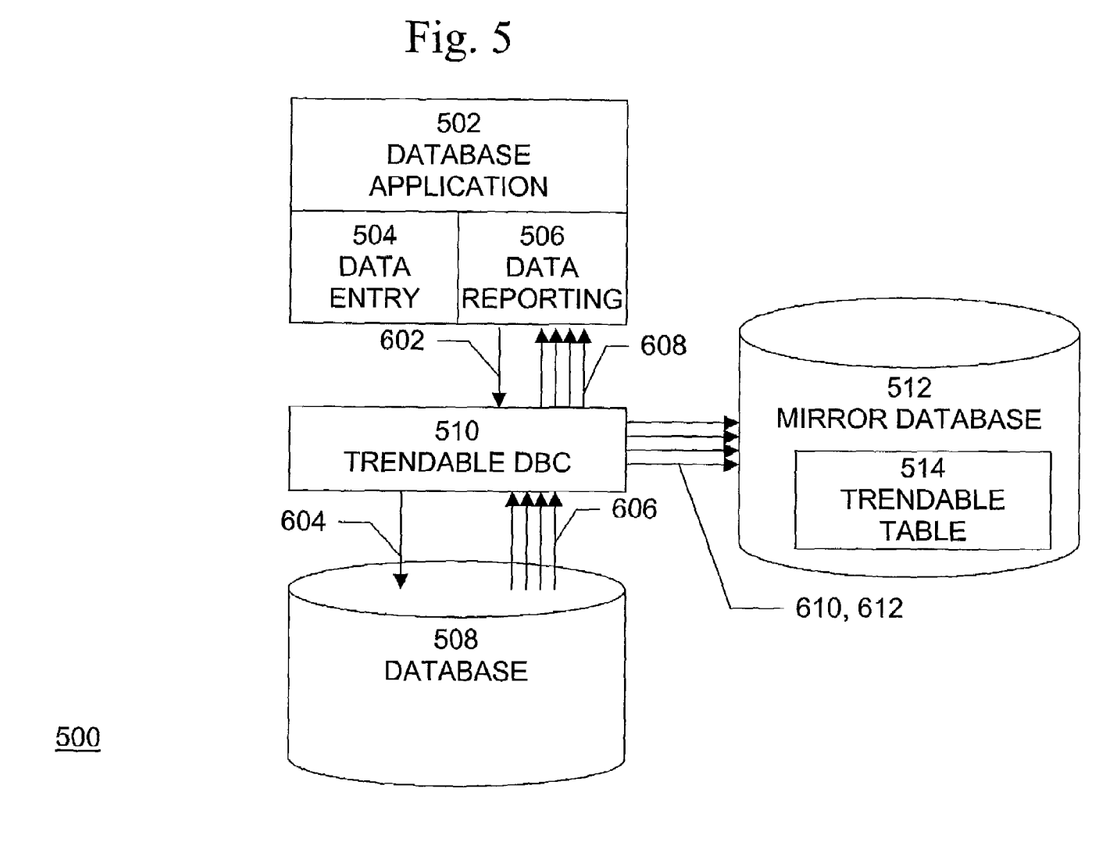
FIG. 5 is an exemplary block diagram and data flow diagram of one embodiment of a database management system that includes trend analysis.

An exemplary block diagram and data flow diagram of one embodiment of a database management system 500 that includes trend analysis is shown in FIG. 5. System 500 includes database application 502, including data entry functions 504 and data reporting functions 506, database 508, trendable database connectivity layer 510 and mirror database 512. In this embodiment, the standard database connectivity layer is replaced by a modified database connectivity layer, trendable database connectivity layer 510. Trendable database connectivity layer 510 includes new database access routines that provide the capability to automatically generate data needed in order to perform trend analysis. This requires that modifications be made to database application 502 in order to implement the trend analysis functions provided by the present invention. However, this embodiment does not require a database that includes information to indicate the database queries for which trend analysis is to be performed. Rather, database application 502 is modified to invoke the new trendable database functionality, when desired. This embodiment is typically more suited for use with procedural implementations of database applications.

Figure 6:
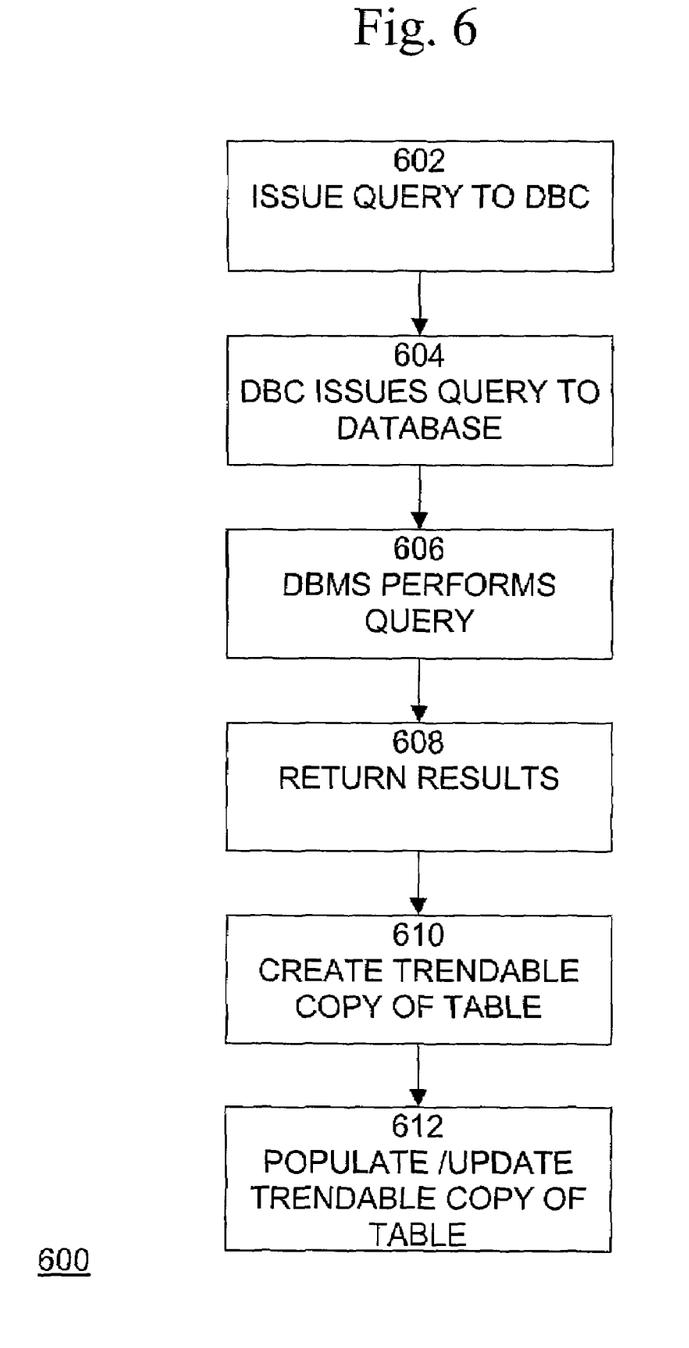
FIG. 6 is a flow diagram of a process of operation of the database management system shown in FIG. 5.

A flow diagram of a process of operation 600 of database management system 500 is shown in FIG. 6. It is best understood with reference to FIG. 5. Process 600 begins with step 602, in which a query is issued by database application 502 by invoking a trendable query function. As trend analysis is a data reporting function, rather than a data entry function, the query is issued from among the data reporting functions 506 included in database application 502. The query is issued to trendable database connectivity layer 510. In step 604, trendable database connectivity layer 510 issues the query to database 508. In step 606, database 508 performs the query by accessing and retrieving the stored information specified by the query and returning the retrieved result set, or a pointer or reference to the retrieved result set, to trendable database connectivity layer 510.

In step 608, the retrieved result set, or a pointer or reference to the retrieved result set, is returned to database application 502 via trendable DBC 510. In step 610, a trendable copy of a database table, trendable table 514, that is suitable to store the data included in the retrieved result set is created or updated in mirror database 610. Trendable table 514 is only created if it is not already in existence. For example, the first time a particular database query for which trend analysis is to be performed is executed, trendable table 514 is created. Subsequent executions of that same query will not cause trendable table 514 to be created. In step 612, the retrieved result set is transmitted to mirror database 516 and the trendable table 514 is populated or updated with the retrieved result set and other data needed to perform trend analysis, such as a time stamp on each row of data entered into the trendable table 514. In addition, the retrieved result set is returned to database application 502. The first time a particular database query for which trend analysis is to be performed is executed, the newly created trendable table 514 is populated with the retrieved result set and other data. Subsequent executions of that same query will cause trendable table 514 to be updated with the addition of the current retrieved result set and other data. Thus, multiple executions of a particular database query build up trendable table 514 to contain multiple retrieved result sets, along with the other data, such as timestamp information, that allow trend analysis to be performed. Trend analysis may then be performed upon the trendable table 514, as desired.

Figure 7:
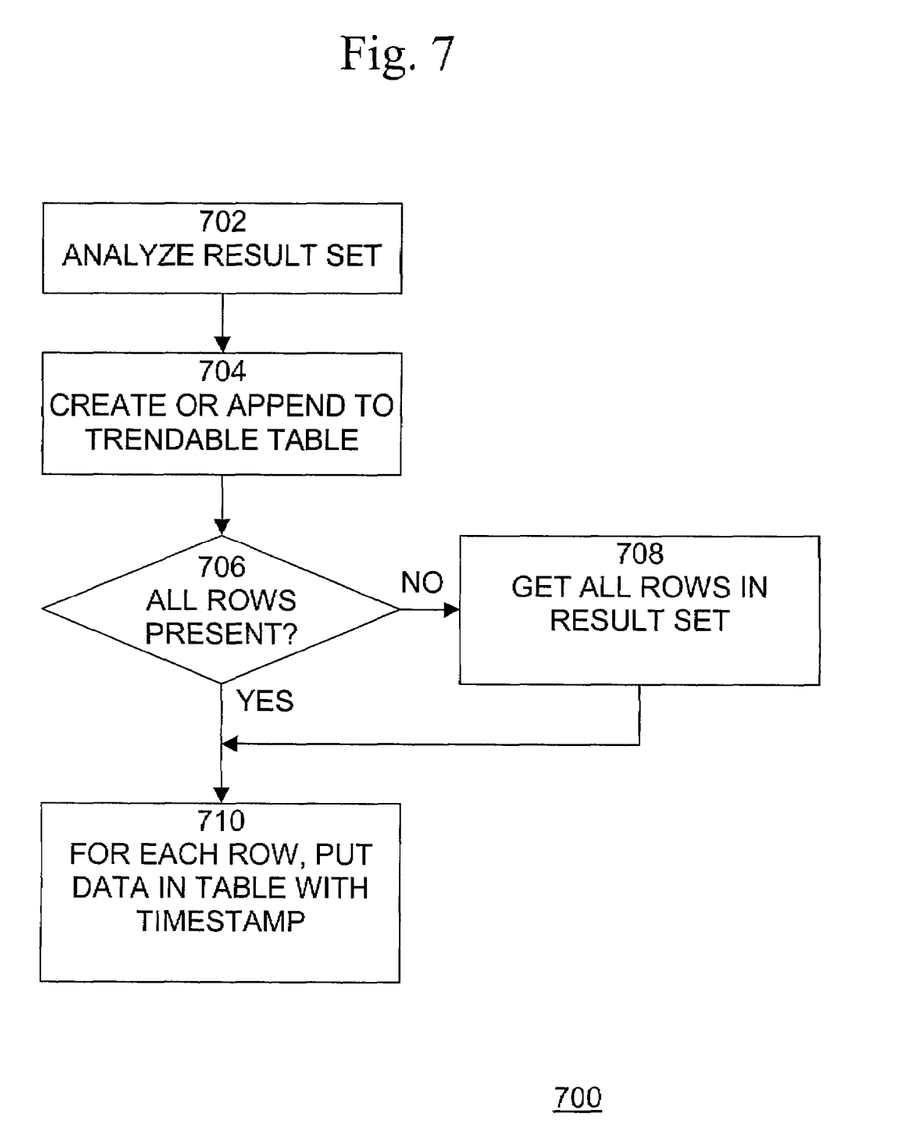
FIG. 7 is a flow diagram of a process for performing certain steps of the processes shown in FIGS. 4 and 6.

An exemplary flow diagram of a process 700 for creating and populating a trendable copy of a data table, such as is performed in steps 412 and 414 of FIG. 4 or steps 610 and 612 of FIG. 6, is shown in FIG. 7. Process 700 begins with step 702, in which the data table including the retrieved result set is analyzed. The analysis may be performed by using, for example, a database Describe functionality, which analyzes the format of the result set. In step 704, a trendable table, which will become a trendable copy of the result set table, is created, if it does not already exists, or is updated, if it does already exist. The created trendable table is structured based on the format of the result set table, along with storage for timestamp information that is to be generated. The trendable table must be named and the name given to the trendable table may be specified by the programmer or user, or the name given to the trendable table may be automatically generated. For example, an automatically generated name may be the same as the result set table name, similar to the result set table name, or related to or based on the name of the result set table, depending upon the implementation. Likewise, the name given to the trendable table may be automatically generated by, for example, defaulting to a hash value that is uniquely generated based on the query and the connection that produced the result set. This provides the capability to ensure that different users, identified by different connections, will see different results, based on security settings.

In step 706, it is determined whether the result set table that was presented to the user (returned to the calling database application) includes all rows in the result set that was retrieved. Typically, this is done simply by counting the number of rows included in the result set that was returned and comparing this number to the number of rows included in the complete result set. If it is determined that the result set table that was presented to the user does not include all rows in the result set that was retrieved, then the process continues with step 708, in which all rows in the result set are obtained so that they may be included in the trendable table. The process then continues with step 710. If, in step 706, it is determined that the result set table that was presented to the user does include all rows in the result set that was retrieved, then the process continues with step 710.

In step 710, the trendable table is populated by inserting each row in the result set into the trendable table that was created, along with timestamp information for each inserted row.

The embodiment of a process for creating and populating a trendable copy of a data table that is shown in FIG. 7 includes determining whether the result set table that was presented to the user (returned to the calling database application) includes all rows in the result set that was retrieved. This embodiment has the advantage of being efficient, in that rows of data are only obtained by the trendable table populating process if the rows are not already included in the returned result set. However, in a simpler embodiment, the trendable table populating process may always obtain all rows in the result set, whether returned or not.

One implementation issue that arises has to do with the mirror database, such as mirror database 316, shown in FIG. 3, or mirror database 512, shown in FIG. 5. The result set table that is generated has certain security rules that control who can look at or modify the result set table. However, in some implementations, the trendable table that is created in the mirror database, which includes the information included in the result set table, may have different security rules than the result set table. It is preferable to use implementations in which the security rules of the result set table are applied to the trendable table as well. A preferred embodiment that provides such an implementation would include a central mirror database that is used for most or all trend analysis. This central database would provide a consistent security implementation in which the security rules of the result set table are applied to the trendable table.

It is important to note that while the present invention has been described in the context of a fully functioning data processing system, those of ordinary skill in the art will appreciate that the processes of the present invention are capable of being distributed in the form of a computer readable storage medium of instructions Examples of computer readable storage media include recordable-type media such as floppy disc, a hard disk drive, RAM, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of automatically capturing data for trend analysis in a database management system comprising the steps of:

receiving a query for data from a database application;

issuing the received query to a database management system;

receiving a response to the query from the database management system, wherein the response indicating a result dataset indicates a result data table;

automatically creating or updating a database table that is suitable for trend analysis, the database table comprising information upon which trend analysis is to be performed and information that is generated in order to perform the trend analysis, the database table arranged so that subsequent executions of the same query will cause the database table to be updated with the addition of a current retrieved result dataset so that multiple executions of the same database query cause database table to contain multiple retrieved result datasets upon which trend analysis is to be performed; and populating or updating the database table with data from the result dataset and with timestamp information for each row of data in the result data table, wherein the populating or updating step comprises the steps of:

determining whether the result data table includes all rows of data in the result dataset;

retrieving all rows in the result dataset, if the result data table does not include all rows in the result dataset; and for each row of data in the result data set, populating or updating a row in the database table with the row of data and with timestamp information.

2. The method of claim 1, wherein the creating step comprises the steps of:

analyzing a format of the result dataset; and creating the database table based on the format of the result dataset or updating an existing database table based on the format of the result dataset.

3. The method of claim 1, further comprising the step of determining whether the result dataset is to be captured for trend analysis; and wherein the creating or updating step comprises the step of creating or updating a database table that is suitable for trend analysis, if the result dataset is to be captured for trend analysis.

4. The method of claim 3, wherein the creating or updating step comprises the steps of:

analyzing a format of the result dataset; and creating the database table based on the format of the result dataset or updating an existing database table based on the format of the result dataset.

5. A trendable database connectivity layer in a database management system operable to perform the steps of:

receiving a query for data from a database application;

issuing the received query to a database management system;

receiving a response to the query from the database management system, wherein the response indicating a result dataset indicates a result data table;

automatically creating or updating a database table that is suitable for trend analysis, the database table comprising information upon which trend analysis is to be performed and information that is generated in order to perform the trend analysis, the database table arranged so that subsequent executions of the same query will cause the database table to be updated with the addition of a current retrieved result dataset so that multiple executions of the same database query cause database table to contain multiple retrieved result datasets upon which trend analysis is to be performed; and populating or updating the database table with data from the result dataset and with timestamp information for each row of data in the result data table, wherein the populating or updating step comprises the steps of:

determining whether the result data table includes all rows of data in the result dataset;

retrieving all rows in the result dataset, if the result data table does not include all rows in the result dataset; and for each row of data in the result data set, populating or updating a row in the database table with the row of data and with timestamp information.

6. The trendable database connectivity layer of claim 5, wherein the creating step comprises the steps of:
analyzing a format of the result dataset; and
creating the database table based on the format of the result dataset or updating an existing database table based on the format of the result dataset.

7. A database management system related to a database connectivity layer for trend analysis comprising:
a database operable to store and retrieve data;
a database application operable to utilize the database; and
a database connectivity layer operable to provide an interface between the database application and the database, wherein the database connectivity layer comprises:
a database connectivity layer component operable to provide an interface between a database application and a database; and
a cover layer between the database connectivity layer component and the database application operable to capture and implement invocations by the database application of functions included in database connectivity layer component that create or update a database table that is suitable for trend analysis, the database table comprising information upon which trend analysis is to be performed and information that is generated in order to perform the trend analysis, the database table arranged so that subsequent executions of the same query will cause the database table to be updated with the addition of a current retrieved result dataset so that multiple executions of the same database query cause database table to contain multiple retrieved result datasets upon which trend analysis is to be performed, but pass through to the database connectivity layer component invocations by the database application of functions that do not involve trend analysis;
wherein the cover layer is further operable to perform the steps of populating or updating the database table with data from the result dataset and with timestamp information wherein the populating or updating step comprises:
determining whether the result data table includes all rows of data in the result dataset;
retrieving all rows in the result dataset, if the result data table does not include all rows in the result dataset; and
for each row of data in the result data set, populating or updating a row in the database table with the row of data and with timestamp information.

8. The database management system of claim 7, wherein the populating or updating the database table with data from the result dataset comprises:
receiving a query for data from a database application;
issuing the received query to a database management system;
receiving a response to the query from the database management system, the response indicating a result dataset;
determining whether the result dataset is to be captured for trend analysis;
creating or updating a database table that is suitable for trend analysis; and
populating or updating the database table with data from the result dataset.

9. The database management system of claim 8, wherein the creating step comprises the steps of:
analyzing a format of the result dataset; and
creating the database table based on the format of the result dataset or updating an existing database table based on the format of the result dataset.

10. A database management system related to a database connectivity layer, comprising:
a database operable to store and retrieve data;
a database application operable to utilize the database; and
a trendable database connectivity layer operable to perform the steps of:
receiving a query for data from a database application;
issuing the received query to a database management system;
receiving a response to the query from the database management system, wherein the response indicating a result dataset indicates a result data table;
automatically creating or updating a database table that is suitable for trend analysis, the database table comprising information upon which trend analysis is to be performed and information that is generated in order to perform the trend analysis, the database table arranged so that subsequent executions of the same query will cause the database table to be updated with the addition of a current retrieved result dataset so that multiple executions of the same database query cause database table to contain multiple retrieved result datasets upon which trend analysis is to be performed; and
populating or updating the database table with data from the result dataset and with timestamp information for each row of data in the result data table, wherein the populating or updating step comprises the steps of:
determining whether the result data table includes all rows of data in the result dataset;
retrieving all rows in the result dataset, if the result data table does not include all rows in the result dataset; and
for each row of data in the result data set, populating or updating a row in the database table with the row of data and with timestamp information.

11. The database management system of claim 10, wherein the creating step comprises the steps of:
analyzing a format of the result dataset; and
creating the database table based on the format of the result dataset or updating an existing database table based on the format of the result dataset.

12. A computer program product for automatically capturing data for trend analysis in an electronic data processing system, comprising:
a computer readable storage medium;
computer program instructions, recorded on the computer readable storage medium, executable by a processor, comprising:
instructions for receiving a query for data from a database application;
instructions for issuing the received query to a database management system;
instructions for receiving a response to the query from the database management system, wherein the response indicating a result dataset indicates a result data table;
instructions for automatically creating or updating a database table that is suitable for trend analysis, if the database table does not already exist, the database table comprising information upon which trend analysis is to be performed and information that is generated in order to perform the trend analysis, the database table arranged so that subsequent executions of the same query will cause the database table to be updated with the addition of a current retrieved result dataset so that multiple executions of the same database query cause database table to contain multiple retrieved result datasets upon which trend analysis is to be performed; and instructions for populating or updating the database table with data from the result dataset and with timestamp information for each row of data in the result data table, wherein the instructions for populating or updating comprises:

instructions for determining whether the result data table includes all rows of data in the result dataset;

instructions for retrieving all rows in the result dataset, if the result data table does not include all rows in the result dataset; and for each row of data in the result data set, instructions for populating or updating a row in the database table with the row of data and with timestamp information.

13. The computer program product of claim 12, wherein the instructions for creating comprises:

instructions for analyzing a format of the result dataset; and instructions for creating the database table based on the format of the result dataset or updating an existing database table based on the format of the result dataset.

14. The computer program product of claim 12, further comprising instructions for determining whether the result dataset is to be captured for trend analysis; and wherein the instructions for creating or updating comprises instructions for creating or updating a database table that is suitable for trend analysis, if the result dataset is to be captured for trend analysis.

15. The computer program product of claim 14, wherein the instructions for creating or updating comprises:

instructions for analyzing a format of the result dataset; and instructions for creating the database table based on the format of the result dataset or updating an existing database table based on the format of the result dataset.

* * * * *